(No Model.)
F. S. CLARK.
PROCESS OF OBTAINING CREOSOTE, &c.
No. 388,529. Patented Aug. 28, 1888.
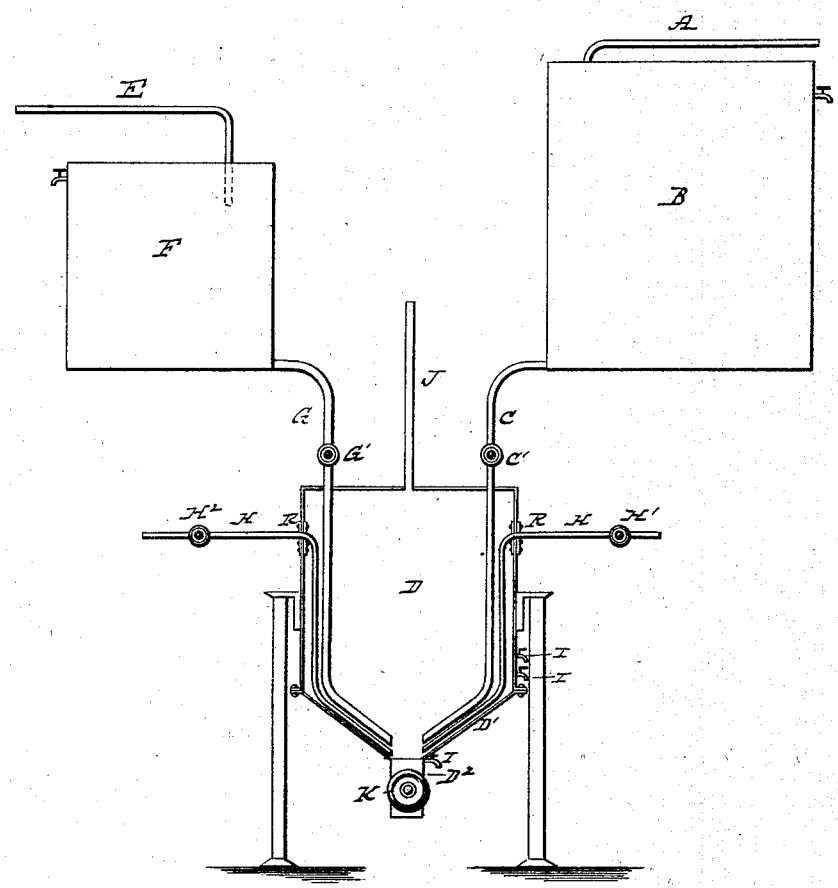
Witnesses:
Inventor,
Franklin S. Clark.
By his Attorney

UNITED STATES PATENT OFFICE.

FRANKLIN S. CLARK, OF CHARLESTON, SOUTH CAROLINA.

PROCESS OF OBTAINING CREOSOTE, &c.

SPECIFICATION forming part of Letters Patent No. 388,529, dated August 28, 1888.

Application filed April 27, 1887. Serial No. 236,289. (No model.)

*To all whom it may concern:*

Be it known that I, FRANKLIN S. CLARK, of Charleston, in the county of Charleston and State of South Carolina, have invented certain new and useful Improvements in the Process for the Manufacture of Creosote and Acetate of Soda; and I do hereby declare the following to be a full, clear, and exact description of the invention, such as will enable others skilled in the art to which it appertains to make and use the same.

My invention relates to an improvement in the process for the economical production of creosote from pyroligneous compounds that are found in the residuum obtained in the distillation of turpentine and lubricating-oil from resinous wood or other substances.

My invention consists in the economical production of creosote and acetate of soda from the residuums separated in the process of refining turpentine or heavier tarry oils used for lubricating purposes from the crude products of the distillation of vegetable, arboreal, or mineral substances.

My improvement also consists in the employment of certain mechanism and manipulation of the same.

The annexed drawing exhibits a side elevation of the apparatus preferably used, which will be hereinafter specifically described.

In the manufacture of merchantable products from the organic constituents of resinous woods or other proper material four important substances are to be considered—viz., turpentine, lubricating-oil, creosote, and pyroligneous acid.

In the process of purification of turpentine and the heavier lubricating-oil or resinous woods the employment of caustic soda is necessary to remove impurities known as "phenols" or "creosote." The use of caustic soda enhances the cost of the purifying operation if some economic means for the utilization of waste caustic-soda liquors is not employed. Heretofore no such method has successfully been introduced. It is true that the waste liquor of caustic soda resulting from the purification of turpentine or the heavier lubricating-oil has been treated to obtain creosote by neutralizing the caustic soda with a mineral acid—such as sulphuric acid—that will accomplish the liberation of the phenols or creosote, which latter floats on the surface as an oil. When sulphuric acid is employed to set free the creosote, a loss is incurred, as the sulphuric acid combines with the caustic soda previously used to purify the turpentine or other oil, and they together form sulphate of soda, which is of small commercial value.

The pyroligneous acid, which is one of the substances to be considered, is converted into a marketable product by treating it with lime or carbonate of soda, the result being a production of acetate of lime or acetate of soda by the chemical action of the lime or soda on the pyroligneous acid. This entails an expenditure for lime or carbonate of soda. I employ a combination process that is based on rudimentary principles, which may be stated as follows: First, crude or distilled pyroligneous acid will precipitate creosote (phenols) from caustic-soda solution or any caustic-alkali solution; second, that the above-named precipitation also produces acetate of soda by the union of the acetic acid (of the pyroligneous acid) with the waste caustic soda or any other caustic-soda liquid free from creosote.

My improved process, which will now be described, affords the following-named advantages, viz: first, dispensing with the use of sulphuric acid for purposes of precipitation; second, utilization of the caustic soda by its conversion into a valuable acetic-acid salt or acetate of soda; third, reduction of the amount of lime necessary to make acetate of lime; fourth, obviating the cost of sulphuric acid, the danger of handling it, and affording independence in regard to varying prices of sulphuric acid and lime; also, the consolidation of two processes into one—viz., the production of creosote and acetate of soda—effecting a saving by such a union of a reduction of the space for a plant, less labor to the return for product, a decrease in cost of insurance, and merchantable product of higher grade than is afforded by ordinary processes.

My improved process and apparatus for carrying it into effect will now be described.

F is a wooden or metal receiving-tank, into which the waste caustic soda or other alkaline liquor resulting from the refining of distillates to produce turpentine or heavier oils is run.

B is a wooden vat or tank, located, preferably, in the same horizontal plane with the tank F. Proper-sized pipes C G are attached to the bottoms of the tanks B F, the pipes being bent to curve and extend downwardly into a tank, D, which I term an "agitator." The pipes C G are provided with globe-valves C' G' to control the escape of fluid from the tanks to which these pipes are attached.

The agitator D is preferably made of wrought-iron, and has a conical bottom, D', to which a vertically-descending pipe, D², is secured near the center of this bottom, a proper aperture being made at this point to afford an exit-passage for the contents of the agitator. A valve, K, is located in the pipe D² to close it, and thus retain liquor in the agitator D. The pipes C G are extended near the inner surface of the agitator D toward the center of its conical bottom on opposite sides of the orifice made therein.

At points R R, near the upper edge of the agitator D, the air-induction pipes H H are introduced into it, and are extended downwardly to conform nearly to the shape of the interior surface and conical bottom of this agitator. The air-pipes C G are provided with the valves H' H², these pipes being made to communicate with an air-pump that is located at some convenient point to furnish air-jets to the agitator D through the attached pipes just mentioned.

In operation the caustic soda or other alkaline liquid, whether waste or otherwise, that contains creosote residuum from the purification of turpentine or the heavier lubricating-oil, is run into the reservoir or tank F, the crude or preferably distilled pyroligneous acid being stored in the opposite tank, B. A sufficient quantity of the waste caustic-soda liquor or other alkaline liquor to constitute a "charge" is allowed to enter the agitator-chamber D. After the introduction of the alkaline liquor is effected and valve G' closed a limited quantity of the pyroligneous acid is decanted from the storage-tank B into the agitator D. The valve C' is now shut and the valves H' H² opened to permit forcible air-jets to enter near the center of the bottom of the agitator-chamber and thoroughly mix its contents. The forcible commingling of the charge of caustic-soda liquor and pyroligneous acid in the agitator that has just been described should be continued for ten or fifteen minutes, when a complete neutralization of the caustic soda will be effected by chemical affinity, the creosote being precipitated by the action of the pyroligneous acid, and acetate of soda result from this separation. The solution may be made slightly acid, if desired, the effect of adding a slight excess being to precipitate all the creosote, and thus give a better acetate of soda. The point of acidity may be determined by litmus paper; but it can also be seen by tapping at one of the test-cocks I some of the acetate of soda and allowing it to run in a fine stream. If all the creosote has been removed, the liquor will be nearly transparent. The pyroligneous acid is added during constant agitation, which is preferably effected by the air-currents, as stated, to make a more perfect reaction. After the addition of the necessary amount of acid the liquor is allowed to settle, the oil (creosote) going to the bottom and the acetate of soda forming the upper liquid. By opening the lower valve, K, the creosote-oil will pass out into any suitable receptacle, while the acetate of soda will not appear at the valve until all the creosote is out. The valve is then closed. The creosote thus obtained is a brown to black colored oil of a specific gravity 1.080. It contains about forty-five per cent. of real wood-creosote, with water, light tar-oil, (turpentine,) and heavy tar-oil, (lubricating-oil.) The process may be used for coal-tar, creosote, or phenols derived from other material. It may be worked up for creosote in a pure state, in which operation the crude oil (creosote) is distilled in a tar-still, and the light and heavy oils separated by a fractional distillation and worked for turpentine and lubricating-oil. The fraction passing off in the middle of the distillation and having a specific gravity of 1.045 to 1.050 is kept apart and worked further for creosote by any of the creosote processes. The liquid remaining in the iron tank D after the separation of the creosote is a weak solution of acetate of soda, and must be boiled down to a specific gravity of 1.230 for crystallization. This boiling may be done in a separate vessel or the iron tank in which the precipitation was effected, in which case the tank must be made with a steam-jacket. During the evaporation any tar which collects upon the surface must be skimmed off, and when the solution is at the required test it is run out into a small crystallizing-pan. From this point any of the ordinary processes for making acetate of soda are followed.

It is obvious that by this process not only is the acetate of soda produced, but the creosote contained in the waste alkaline solution as well as creosote from the pyroligneous-acid solution are deposited, and this without the use of sulphuric acid, as previously employed.

When I refer in this specification to the use of "soda" or "soda solution," it is to be understood that a potash solution operates in identically the same way, and my specification and claim are intended to refer to both.

Having fully described my improved process for the utilization of waste caustic-alkaline liquor and the production of creosote of commerce and acetate of soda from pyroligneous acid as treated by my process, what I claim as new, and desire to secure by Letters Patent, is—

The process herein described, which consists in mingling caustic-soda solution containing creosote or analogous phenoloid bodies with pyroligneous acid, thereby occasioning a reaction between the mingled bodies, and depositing creosote, and forming acetate of soda by the union of the soda solution and the acetic acid of the pyroligneous-acid solution, substantially as described.

In testimony whereof I have signed this specification in the presence of two subscribing witnesses.

FRANKLIN S. CLARK.

Witnesses:
JOHN C. MALLONEE,
GEORGE S. BROWN.